(12) United States Patent
Wang et al.

(10) Patent No.: US 11,480,747 B2
(45) Date of Patent: Oct. 25, 2022

(54) CONNECTOR ASSEMBLY

(71) Applicant: Dongguan Luxshare Technologies Co., Ltd, Dongguan (CN)

(72) Inventors: Xiao-Kai Wang, Dongguan (CN); Bai-Yu Duan, Dongguan (CN); Xiao-Ping Wu, Dongguan (CN); You-Rui Zhang, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 73 days.

(21) Appl. No.: 17/154,546

(22) Filed: Jan. 21, 2021

(65) Prior Publication Data

US 2021/0141175 A1   May 13, 2021

(30) Foreign Application Priority Data

Jan. 22, 2020   (CN) .......................... 202020144020.7

(51) Int. Cl.
*G02B 6/42* (2006.01)
(52) U.S. Cl.
CPC ........... *G02B 6/4269* (2013.01); *G02B 6/423* (2013.01); *G02B 6/4292* (2013.01)
(58) Field of Classification Search
CPC .... G02B 6/426; G02B 6/4261; G02B 6/4269; G02B 6/428; H01R 13/7172
See application file for complete search history.

(56) References Cited

U.S. PATENT DOCUMENTS

| | | | | |
|---|---|---|---|---|
| 7,601,021 B1* | 10/2009 | Yang | ................... | G02B 6/4261 |
| | | | | 439/487 |
| 9,933,555 B2* | 4/2018 | Henry | ................... | G02B 6/008 |
| 2009/0258534 A1* | 10/2009 | Bright | ................. | G02B 6/4246 |
| | | | | 439/490 |
| 2012/0155108 A1* | 6/2012 | Scholeno | ............ | G02B 6/4298 |
| | | | | 362/580 |
| 2016/0308313 A1* | 10/2016 | Yang | .................... | G02B 6/0008 |
| 2020/0142142 A1* | 5/2020 | Luo | ..................... | G02B 6/4269 |

FOREIGN PATENT DOCUMENTS

| | | |
|---|---|---|
| CN | 201360070 Y | 12/2009 |
| CN | 205846322 U | 12/2016 |
| CN | 206236849 U | 6/2017 |

(Continued)

*Primary Examiner* — Michael Stahl
(74) *Attorney, Agent, or Firm* — Birch, Stewart, Kolasch & Birch, LLP (57) ABSTRACT

A connector assembly includes housing and one or more light guide members. Each light guide member includes a tube body, an extension column, a positioning member, and a fixing member. The tube body is located on the housing. The extension column extends downward from the tube body to a rear side of the housing. The positioning member is located on the extension column and inserted into a rear wall of the housing. The fixing member is located on the extension column and inserted into the rear wall. The fixing member includes a first bump protruding from the extension column toward the rear wall and a hook structure located on the first bump. When each light guide member is assembled onto the housing, the first bump is inserted into the rear wall, and the hook structure is hooked into the rear wall.

30 Claims, 8 Drawing Sheets

(56) References Cited

FOREIGN PATENT DOCUMENTS

| | | | |
|---|---|---|---|
| CN | 206364316 U | | 7/2017 |
| CN | 109407224 A | | 3/2019 |
| CN | 208888421 U | | 5/2019 |
| CN | 110275253 A | | 9/2019 |
| TW | M287944 U | * | 2/2006 |
| TW | M359141 U | | 6/2009 |
| TW | 201729471 A | | 8/2017 |

* cited by examiner

CONNECTOR ASSEMBLY

CROSS-REFERENCE TO RELATED APPLICATION

This non-provisional application claims priority under 35 U.S.C. § 119(a) to Patent Application No. 202020144020.7 filed in China, P.R.C. on Jan. 22, 2020, the entire contents of which are hereby incorporated by reference.

BACKGROUND

Technical Field

The present disclosure relates to a connector assembly, especially suitable for a small form-factor pluggable connector.

RELATED ART

There are a variety of input/output (I/O) connectors. Some common types of connectors include an SFP (small form-factor pluggable) connector, an XFP (10 Gigabit Small Form Factor Pluggable) connector, a QSFP (Quad Small form-factor pluggable) connector, and a CXP (C form-factor pluggable) connector. Small form-factor pluggable connector assemblies such as an SFP connector, an XFP connector, and a QSFP connector have the advantages of small sizes and low power consumption, and therefore are widely used in the field of optical communication in telecommunications and data communication. The small form-factor pluggable connector assembly is usually provided with an optical transceiver module. When the small form-factor pluggable connector assembly is docked with a docking connector, the optical transceiver module will generate a lot of heat, so that the temperature of the connector assembly will rise rapidly, which will affect running stability and reliability of the connector assembly. Especially, when the demand for data transmission quantity of the connector is increasing with the development of science and technology, according to a conventional method for heat dissipation of the connector assembly by using a heat dissipation hole, the heat dissipation efficiency is not enough to effectively solve the problem of overheating of the connector assembly.

SUMMARY

In view of the above problems, the present disclosure is to provide a connector assembly that can quickly dissipate, through a heat dissipation structure, a large amount of heat generated during use of the connector into the air, thereby solving the problem of insufficient heat dissipation efficiency in the prior art. In addition, the present disclosure further provides a connector, which includes a light guide member easy to install and still has certain stability after assembly without affecting the heat dissipation performance of a heat dissipation structure.

In an embodiment, a connector assembly is provided, including: a housing and at least one light guide member. The housing has an insertion cavity. Each light guide member includes: a tube body, an extension column, a positioning member, and a fixing member. The tube body is located on the housing. The extension column extends downward from the tube body to a rear side of the housing. The positioning member is located on the extension column and inserted into a rear wall of the housing. The fixing member is located on the extension column and inserted into the rear wall of the housing. The fixing member includes a first bump protruding from the extension column toward the rear wall of the housing and a hook structure located on the first bump. When the light guide member is assembled onto the housing, the first bump is inserted into the rear wall of the housing, and the hook structure is hooked into the rear wall of the housing.

In some embodiments, each extension columns has a single fixing member.

In some embodiments, each fixing member does not have a hook structure.

In some embodiments, the positioning member includes a second bump protruding from the extension column toward the rear wall of the housing and a guiding slope located at an edge of a top surface of the second bump.

In some embodiments, the guiding slope surrounds the edge of the top surface of the second bump.

In some embodiments, the guiding slope is formed by inclining a small section at the edge of the top surface of the second bump toward a bottom surface of the second bump.

In some embodiments, the second bump is a semicircular cylinder.

In some embodiments, the positioning member includes a second bump protruding from the extension column toward the rear wall of the housing, and a top end of the second bump is tapered from a side away from the top surface of the second bump toward the top surface of the second bump.

In some embodiments, the first bump is a semicircular cylinder.

In some embodiments, the hook structure is located on a side wall of the first bump, and an upper edge of the hook structure abuts against a top surface of the first bump.

In some embodiments, the fixing member further includes a guiding slope, and the guiding slope is located at an edge of the top surface of the first bump.

In some embodiments, the guiding slope is located on the other side of the edge of the top surface of the first bump relative to the hook structure.

In some embodiments, the guiding slope is formed by inclining the edge of the top surface of the first bump toward a bottom surface of the first bump relative to a small section on one side of the hook structure.

In some embodiments, a distance between an upper edge of the guiding slope and a lower edge of the guiding slope is less than a length of the hook structure.

In some embodiments, the rear wall of the housing has a plurality of holes respectively corresponding to the positioning member and the fixing member, the rear wall of the housing protrudes into each of the holes to form a convex point, when each light guide member is assembled onto the housing, the positioning member and the fixing member are respectively inserted into the corresponding holes, the convex point in the hole corresponding to the fixing member is pressed against a side wall of the first bump, and the convex point in the hole corresponding to the positioning member is pressed against a side wall of the positioning member.

In some embodiments, when the fixing member is inserted into the corresponding holes, a side wall of the fixing member is attached to the other side of the corresponding hole relative to the convex point.

In some embodiments, the side wall of the first bump includes a curved surface and a plane coupled to two opposite side edges of the curved surface, and when all of fixing members are inserted into the corresponding holes, the curved surface of the first bump is attached to an edge of the corresponding hole.

In some embodiments, when the positioning member is inserted into the corresponding holes, a side wall of the positioning member is attached to the other side of the corresponding hole relative to the convex point.

In some embodiments, the positioning member includes a second bump protruding from the extension column toward the rear wall of the housing, a side wall of the second bump includes a curved surface and a plane coupled to two opposite side edges of the curved surface, and when all of the positioning members are inserted into the corresponding holes, the curved surface of the second bump is attached to an edge of the corresponding hole.

In some embodiments, each of the holes is cashew-shaped.

In some embodiments, each light guide member further includes: a positioning portion connected to the tube body and adjacent to one end of an insertion opening of the insertion cavity, where another positioning member matching the positioning portion of each light guide member extends upward from a side wall of the housing, and when each of the light guide members is assembled onto the housing, each of the positioning portions is fixed to the corresponding positioning member.

In some embodiments, another positioning member is a clamping member, and the clamping member is configured to clamp the corresponding positioning portion.

In some embodiments, each light guide member further includes: a bent end bent downward and extending from one end of the tube body and fixed onto a cushion block.

In some embodiments, the connector assembly may further include: a heat sink and a thermal conductive member, where the heat sink is located on the housing, and the thermal conductive member is sandwiched between the heat sink and the housing.

In some embodiments, the connector assembly may further include: an elastic fastener, where the elastic fastener is configured to fasten the heat sink to the housing.

In some embodiments, the heat sink has at least one through hole, and the extension column of each light guide member passes through the heat sink via the corresponding through hole.

In some embodiments, the heat sink has at least one opening, each of the light guide member further comprises: a bent end bent downward and extending from one end of the tube body, and the bent end of each light guide member passes through the heat sink via the corresponding opening.

In some embodiments, the heat sink has at least one notch, each of the light guide member further comprises: a bent end bent downward and extending from one end of the tube body, and the bent end of each light guide member passes through the heat sink via the corresponding notch.

In some embodiments, each notch is located at a rear end of the heat sink.

In some embodiments, a top wall of the housing has a contact window in communication with the insertion cavity and outside of the housing, and the connector assembly further includes a heat dissipation block, and the heat dissipation block is located between the thermal conductive member and the insertion cavity and embedded in the contact window.

DETAILED DESCRIPTION

Figure 1:
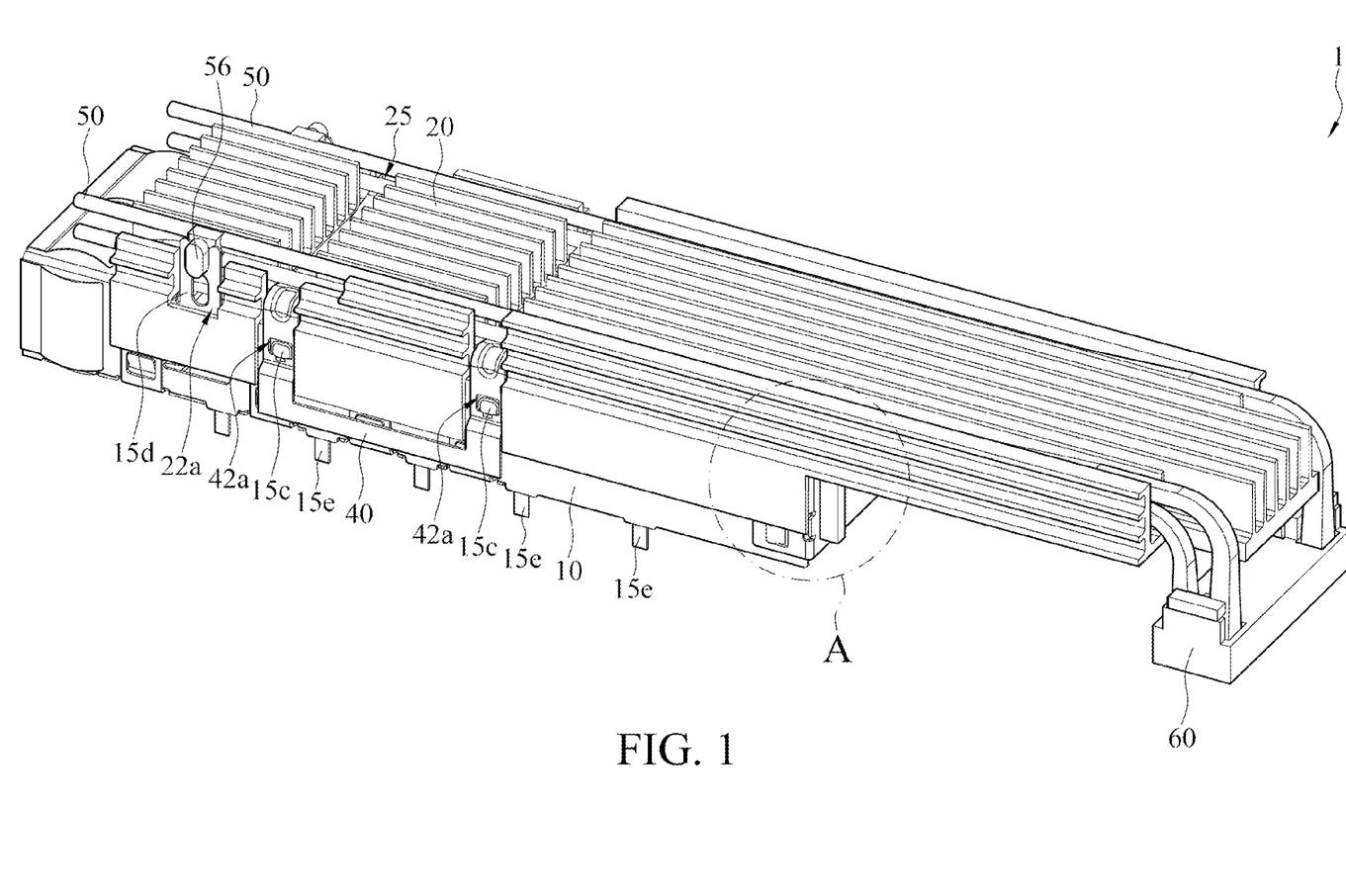
FIG. 1 is a schematic diagram of a connector assembly according to an embodiment.
Figure 2:
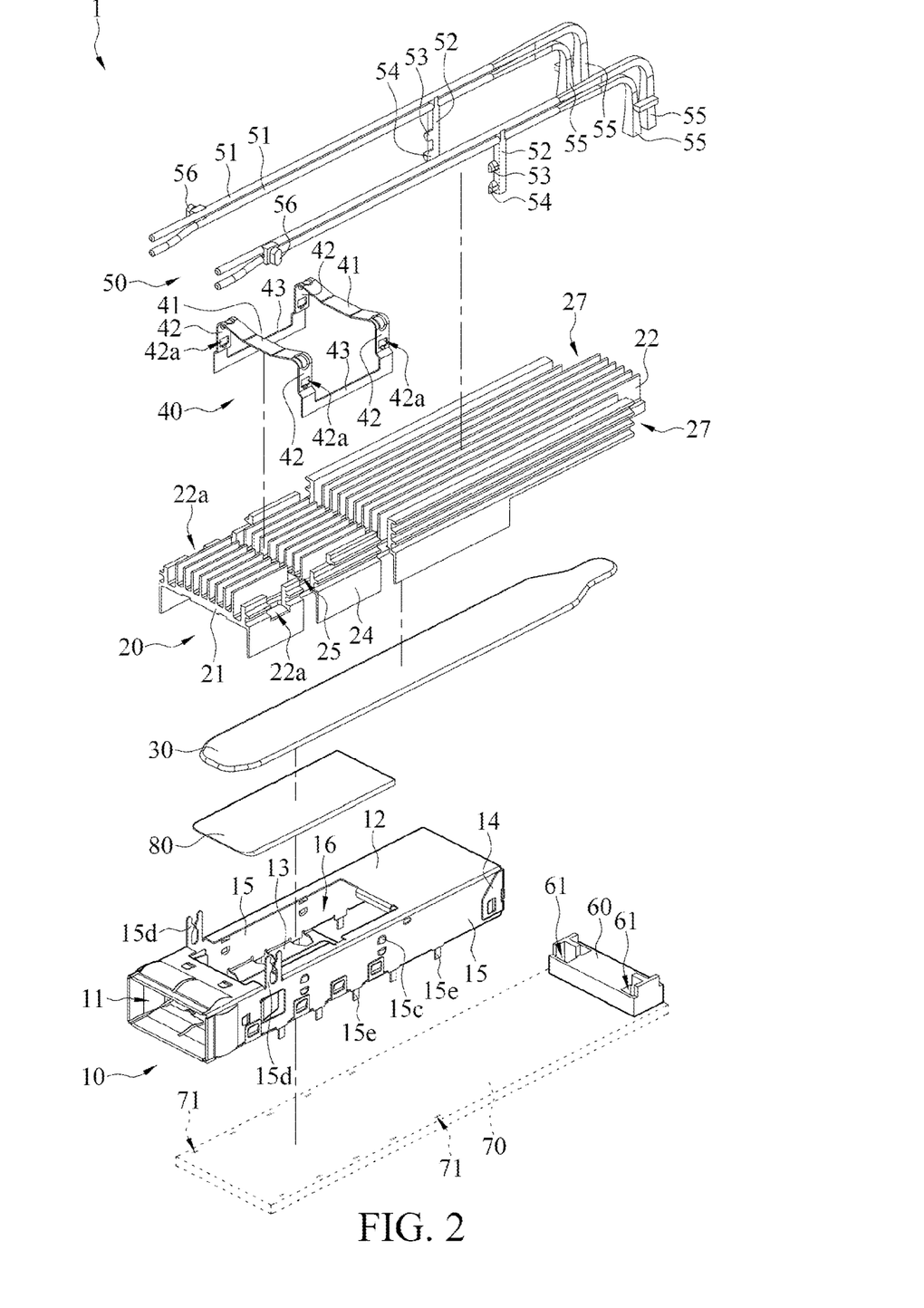
FIG. 2 is an exploded view of a connector assembly of FIG. 1.

Referring to FIG. 1 and FIG. 2, a connecting assembly 1 includes: a housing 10, a heat sink 20, a thermal conductive member 30, an elastic fastener 40, and at least one light guide member 50. Two light guide members 50 are used as examples below, but the number is not limited by the present disclosure.

Figure 3:
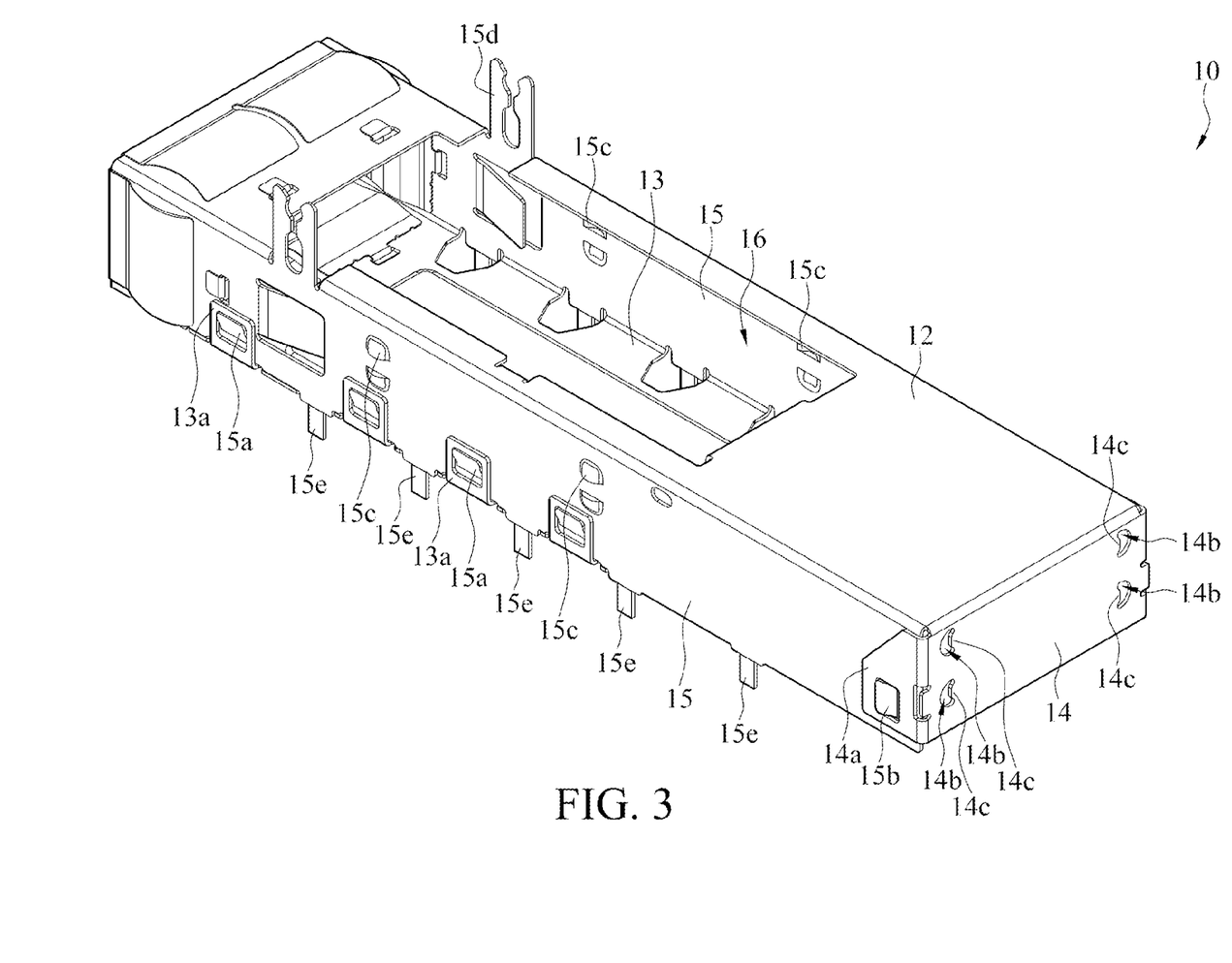
FIG. 3 is a schematic enlarged view of a housing of FIG. 2.

The housing 10 has an insertion cavity 11. The insertion cavity 11 herein is configured to insert a docking connector (not shown) mated with the connector assembly 1. In practice, when completely inserted into the insertion cavity 11 of the connector assembly 1, the docking connector may be connected, in the insertion cavity 11, to a transmission interface provided in the connector assembly 1, and data can be transmitted through transmission and receiving of a signal. In some embodiments, the housing 10 may be a cage. In other words, the housing 10 includes a top wall 12, a bottom wall 13, a rear wall 14, and two side walls 15. The two side walls 15 are opposite to each other and are coupled between the top wall 12 and the bottom wall 13. The rear wall 14 is coupled between the top wall 12, the bottom wall 13, and the two side walls 15. Herein, the top wall 12, the bottom wall 13, the rear wall 14, and the two side walls 15 enclose an insertion cavity 11 with openings located on opposite sides of the rear wall 14. In an example, the top wall 12, the bottom wall 13, the rear wall 14, and the two side walls 15 may be integrally formed. In other words, the housing 10 is formed by bending a plate material and fastening the edges via a matching fastening structure (such as a protrusion 15*a*/15*b* and a snap ring 13*a*/14*a* that are fitted with each other) thereon, as shown in FIG. 3. In another example, the top wall 12, the rear wall 14, and the two side walls 15 may integrally form an upper housing. In other words, the upper housing is formed by bending a plate material and fastening the edges via a matching fastening structure thereon. The upper housing and the bottom wall 13 may form a housing 10 with an insertion cavity 11 through mutual engagement via the matching fastening structures thereon. The housing 10 may be a metal housing.

The heat sink 20 is located on the housing 10, and the thermal conductive member 30 is sandwiched between the heat sink 20 and the housing 10. In addition, the elastic fastener 40 is configured to fasten the heat sink 20 to the housing 10. In other words, the heat sink 20 and the thermal conductive member 30 are disposed on the top wall 12 of the housing 10, and are engaged with the housing 10 via the elastic fastener 40 to be sandwiched between the elastic fastener 40 and the top wall 12 of the housing 10. The elastic fastener 40 herein may apply force toward the housing 10 to the heat sink 20. The whole heat sink 20 may be made of a metal material (such as copper, aluminum alloy, and the like) with high thermal conductivity. The thermal conductive member 30 may be a heat pipe or a temperature equalizing plate, so as to uniformly distribute heat to each part of the thermal conductive member 30.

Figure 4:
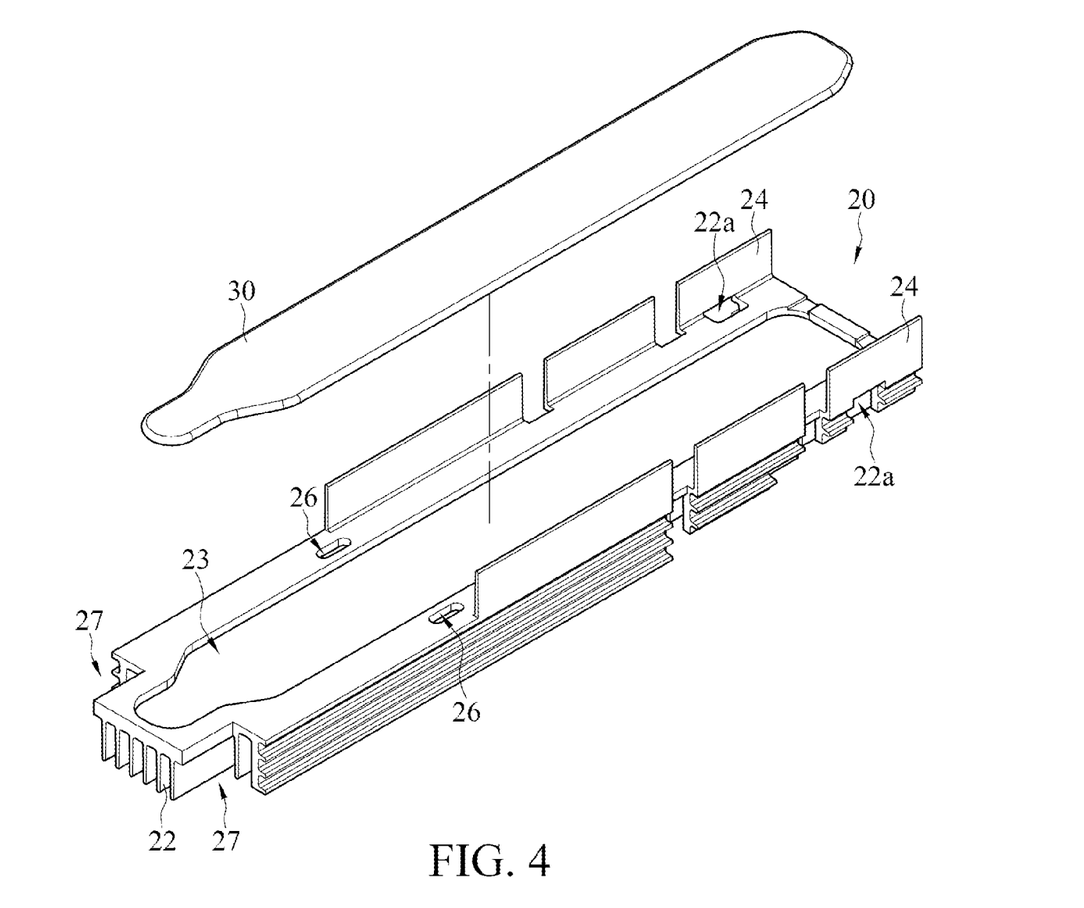
FIG. 4 is a schematic diagram of a relative relationship between a heat sink and a thermal conductive member of FIG. 2.

In some embodiments, the heat sink 20 includes a thermal conductive platform 21 and a plurality of heat dissipation fins 22 arranged side by side and at intervals. The heat dissipation fins 22 stand on an upper surface of the thermal conductive platform 21, and a lower surface of the thermal conductive platform 21 faces the top wall 12 of the housing 10. The heat dissipation fins 22 can quickly dissipate the heat on the heat sink 20 to the air, to complete the heat dissipation and cooling of the connector assembly 1. In some embodiments, the lower surface of the thermal conductive platform 21 has a groove 23, as shown in FIG. 4. Referring to FIG. 1, FIG. 2, and FIG. 4, the thermal conductive member 30 may be accommodated in the groove 23. In other words, an upper surface of the thermal conductive member 30 is attached to a bottom surface of the groove 23, and a lower surface of the thermal conductive member 30 is attached to the top wall 12 of the housing 10. In some embodiments, a length of the thermal conductive member 30 may substantially match a length of the thermal conductive platform 21. In some embodiments, an overlapping area of the thermal conductive member 30 and the thermal conductive platform 21 may be greater than or equal to half of a surface area of the lower surface of the thermal conductive platform 21. In some embodiments, a size of the groove 23 may roughly match the shape of the thermal conductive member 30, so that a side edge of the thermal conductive member 30 is attached to a side wall of the groove 23, thereby enhancing the heat conduction efficiency between the thermal conductive member 30 and the heat sink 20. In some embodiments, the heat sink 20 includes a plurality of limiting walls 24 extending downward. The limiting walls 24 are respectively located at two opposite side edges of the thermal conductive platform 21, and extend from the lower surface of the thermal conductive platform 21 toward the housing 10. The limiting walls 24 are located at edges of the lower surface of the thermal conductive platform 21, and stand on the lower surface of the thermal conductive platform 21. A width of the thermal conductive platform 21 is greater than a width of the top wall 12 of the housing 10. When the heat sink 20 is assembled onto the top wall 12 of the housing 10, the limiting walls 24 of the heat sink 20 will be located outside the two side walls 15 of the housing 10, and the housing 10 is limited between the limiting walls 24 located on the two opposite side edges of the thermal conductive platform 21.

In some embodiments, the elastic fastener 40 may include one or more clamps, and each of the clamps may include an elastic abutting arm 41 and two fixing brackets 42. The fixing bracket 42 is an extension portion formed by bending two ends of the elastic abutting arms 41, that is, two ends of each of the elastic abutting arms 41 are respectively coupled to one end of the fixing bracket 42. Each of the fixing brackets 42 and the side wall 15 of the housing 10 have an engagement structure (such as a protrusion and a locking hole that are engaged with each other) that can be engaged with each other. For example, each of the fixing brackets 42 has a fastening hole 42a, and the side wall 15 of the housing 10 has a protrusion 15c at a position corresponding to the assembly position. During assembly, the elastic abutting arm 41 presses against the heat sink 20, and the fixing bracket 42 extends downward along the side wall 15 of the housing 10, so that the fastening hole 42a of the fixing bracket 42 is fastened to the corresponding protrusion 15c. In another example, each of the fixing brackets 42 may have an inward protrusion, that is, a protrusion (not shown) protruding toward the fixing bracket 42 on the other side of the elastic abutting arm 41. In this case, a fastening hole (not shown) matching the protrusion is formed at a position corresponding to the assembly position on the side wall 15 of the housing 10. In some embodiments, when the elastic fastener 40 is designed as a plurality of clamps, the clamps can be connected by a connecting arm, that is, the other ends of the fixed brackets 42 are connected by a connecting arm 43. In an example, the fastening hole 42a (or the protrusion) on the fixing bracket 42 may be formed on the connecting arm 43 (not shown) instead. The protrusion 15c (or the fastening hole) is formed at a position corresponding to the connecting arm 43 instead on the side wall 15 of the housing 10.

Figure 5:
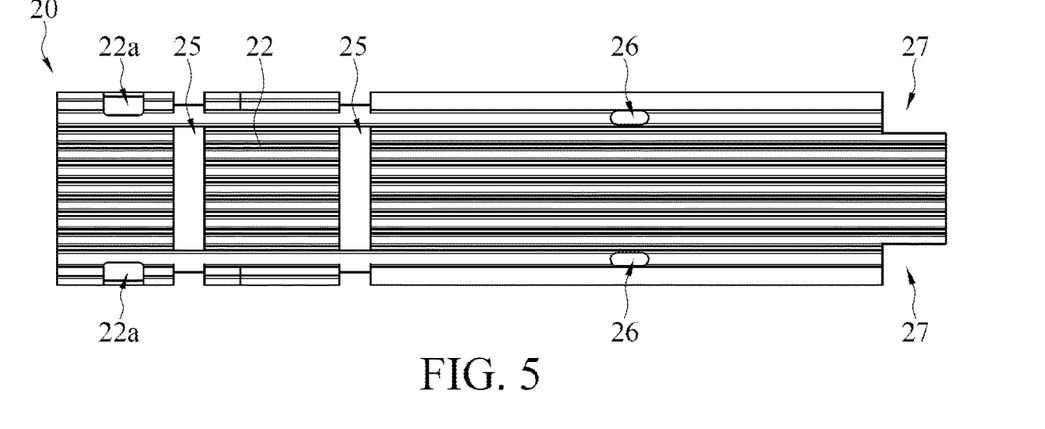
FIG. 5 is an enlarged top view of a heat sink of FIG. 2.

In some embodiments, referring to FIG. 1, FIG. 2, and FIG. 5, the heat sink 20 may further include one or more trenches 25 extending along a short axis of the heat sink 20 and in communication with two side edges of the heat sink 20. In other words, each of the trenches 25 penetrates through two sides of the heat sink 20, that is, transversely penetrates through a plurality of heat dissipation fins 22. During assembly, the elastic abutting arm 41 of the elastic fastener 40 is to be disposed in the trench 25, and is pressed against the bottom of the trench 25 through engagement of the elastic fastener 40 and the side wall 15 of the housing 10, to sandwich the heat sink 20 on the housing 10. In an example, during assembly, the elastic abutting arm 41 may be clamped in the trench 25, that is, the position of the elastic abutting arm 41 is limited by the heat dissipation fins 22 on two sides of the trench 25.

Each of the light guide members 50 includes: a tube body 51, an extension column 52, a positioning member 53, and a fixing member 54. During assembly of the connector assembly 1, the tube body 51 is located on the heat sink 20. The extension column 52 extends downward from the tube body 51 and passes through the heat sink 20, and extends to a rear side of the housing 10. The extension column 52 herein is also fixed onto the rear wall 14 of the housing 10 via the positioning member 53 and the fixing member 54. In other words, one end of the extension column 52 is coupled to the tube body 51, and a side wall of the other end of the extension column 52 has the positioning member 53 and the fixing member 54. The positioning member 53 and the fixing member 54 are inserted into the rear wall 14 of the housing 10. In an example, the tube body 51 of each of the light guide members 50 may be implemented by a single light guide tube. In another example, the tube body 51 of each of the light guide members 50 may be implemented by a plurality of light guide tubes, and the light guide tubes extend in the same direction and are arranged up and down in parallel at intervals.

Figure 6:
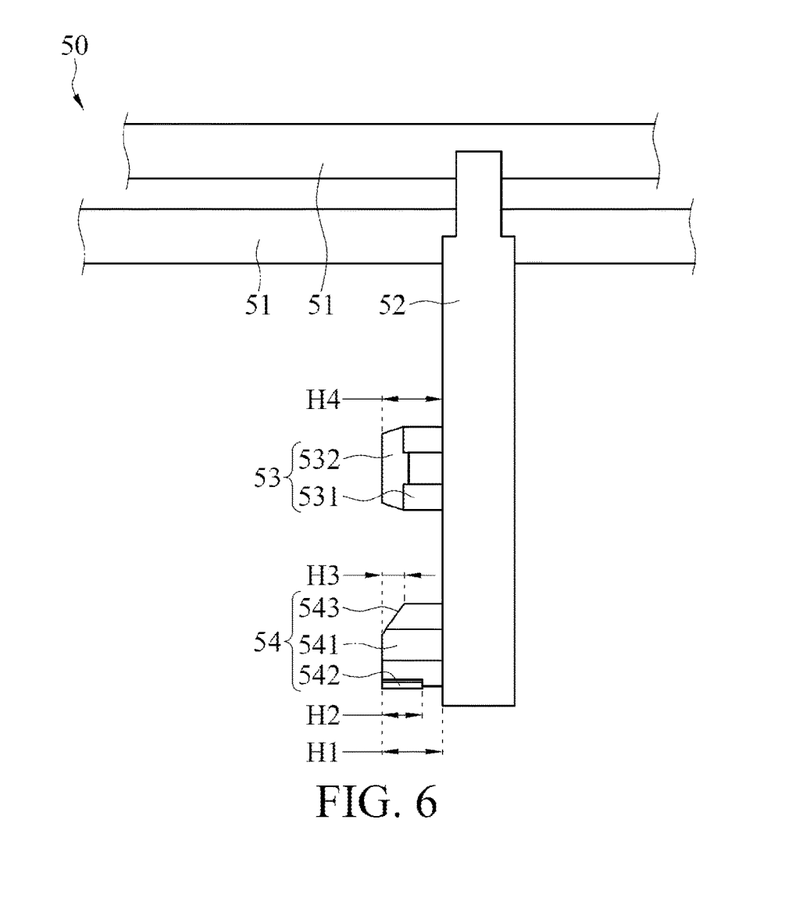
FIG. 6 is an enlarged side view of an extension column of a light guide member of FIG. 2.
Figure 7:
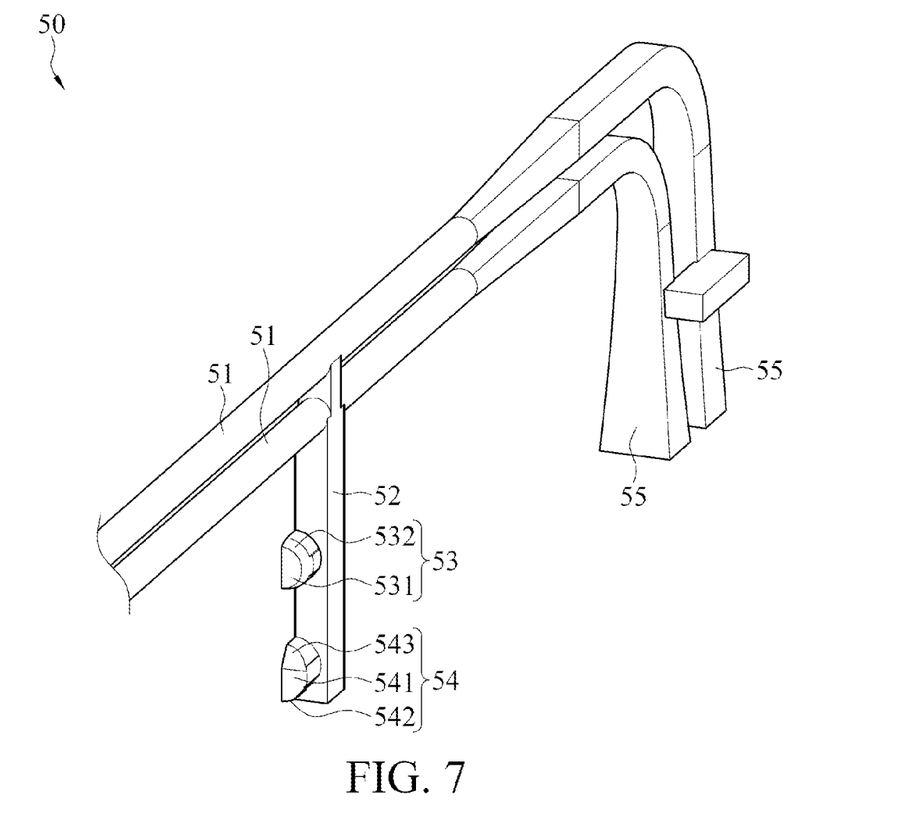
FIG. 7 is an enlarged three-dimensional view of an extension column of a light guide member of FIG. 2.
Figure 8:
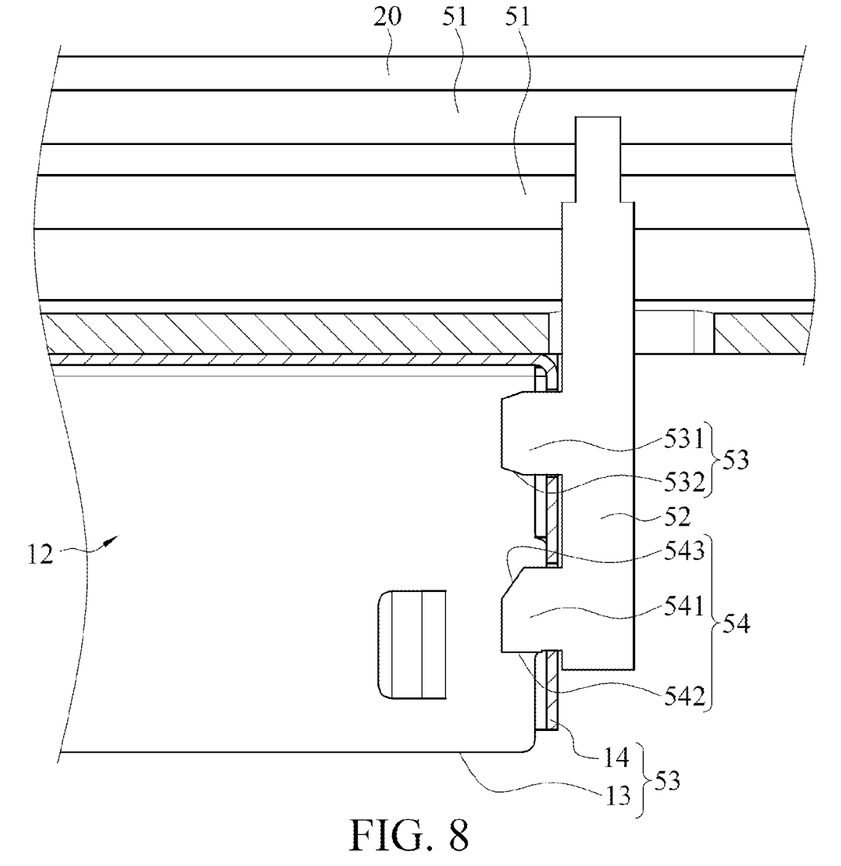
FIG. 8 is an enlarged cross-sectional view of a block A of FIG. 1, which shows a cross-sectional plane through a hook structure and along a direction in which an extension column extends and a length direction of the hook structure.

Referring to FIG. 1, FIG. 2. FIG. 6, and FIG. 7, the fixing member 54 includes a bump (referred to as a first bump 541 below, that is, a body of the fixing member 54) and a hook structure 542. The first bump 541 protrudes from the extension column 52 toward the rear wall 14 of the housing 10, that is, the bottom surface of the first bump 541 is connected to a side wall of the extension column 52, and a top surface of the first bump 541 faces the rear wall 14 of the housing 10. The hook structure 542 is located on a side wall of the first bump 541, and an upper edge of the hook structure 542 abuts against the top surface of the first bump 541. Hereupon, the rear wall 14 of the housing 10 has a hole 14b at an assembly position corresponding to the fixing member 54. When the first bump 541 is inserted into the corresponding hole 14*b* in the rear wall 14 of the housing 10, the hook structure 542 will be hooked into the rear wall 14 of the housing 10. In other words, the hook structure 542 may be in the insertion cavity 11, and a lower edge (that is, a side adjacent to a bottom surface of the first bump 541) of the hook structure 542 is to be snapped into the rear wall 14 (as shown in FIG. 8) at the edge of the hole 14*b*, so as to prevent the light guide member 50 from falling off the housing 10 due to vibration. In an example, a height H1 (that is, a distance between the top surface and the bottom surface of the first bump 541) of the first bump 541 is greater than a length H2 (that is, a distance between the upper edge and the lower edge of the hook structure 542) of the hook structure 542.

In some embodiments, each of the fixing members 54 may further include a guiding slope 543, and the guiding slope 543 is located at an edge of the top surface of the first bump 541. In an example, the guiding slope 543 is located on the other side of the edge of the top surface of the first bump 541 relative to the hook structure 542. In other words, the guiding slope 543 is formed by inclining the edge of the top surface of the first bump 541 toward a bottom surface of the first bump 541 relative to a small section on one side of the hook structure 542. A distance (that is, a height H3 of the guiding slope 543) between an upper edge (that is, a side adjacent to the top surface of the first bump 541) and a lower edge (that is, a side adjacent to the bottom surface of the first bump 541) of the guiding slope 543 may be less than a length H2 of the hook structure 542.

In some embodiments, a body of each of the positioning members 53 is a bump (referred to as a second bump 531 below). The second bump 531 protrudes from the extension column 52 toward the rear wall 14 of the housing 10, that is, the bottom surface of the second bump 531 is connected to a side wall of the extension column 52, and a top surface of the second bump 531 faces the rear wall 14 of the housing 10. In some embodiments, each of the positioning members 53 may further include a guiding slope 532, and the guiding slope 532 is located at an edge of the top surface of the second bump 531. In an example, the guiding slope 532 surrounds the edge of the top surface of the second bump 531. In other words, the guiding slope 532 is formed by inclining a small section at the edge of the top surface of the second bump 531 toward a bottom surface of the second bump 531. Specifically, one end (that is, a top end) of the second bump 531 opposite to the bottom surface is tapered from a side away from the top surface toward the top surface. The positioning member 53 herein does not have a hook structure, so that the positioning member 53 can be inserted into the corresponding hole 14*b* to assist the light guide member 50 in being assembled to the corresponding position.

In some embodiments, the side walls of the bumps such as the first bump 541 and the second bump 531 are formed by a curved surface and a plane. Two opposite side edges of the curved surface are respectively engaged with two opposite side edges of the plane. Referring to FIG. 3, on the rear wall 14 of the housing 10, there is a convex point 14*c* corresponding to the edge of the hole 14*b* of each of the positioning members 53 and each of the fixing members 54, respectively. In other words, the rear wall 14 of the housing 10 protrudes into each of the holes 14*b* to form the convex point 14*c*. When a bump (that is, the first bump 541 or the second bump 531) is inserted into the corresponding hole 14*b*, the convex point 14*c* is pressed against the plane of the corresponding bump, that is, pressed against the side wall of the corresponding bump, so that each of the convex points 14*c* and the edge of the hole 14*b* on the opposite side thereof jointly clamp the first bump 541 or the second bump 531 inserted into the hole 14*b*. In addition, the first bump 541 pushes against the corresponding convex point 14*c*, so that the curved surface of the first bump 541 is attached to the edge (that is, the other side of the hole 14*b* relative to the convex point 14*c*) of the hole 14*b*, and the hook structure 542 can be firmly hooked into the housing 10, thereby effectively preventing the fixing member 54 from falling off the corresponding hole 14*b*. In an example, a size of the hole 14*b* roughly matches a size of the corresponding bump (that is, the first bump 541 or the second bump 531). The bumps such as the first bump 541 and the second bump 531 may be substantially semicircular cylinders. To this end, the holes 14*b* corresponding to the bumps may be cashew-shaped.

In some embodiments, only a single fixing member 54 may be designed on the extension column 52 of each of the light guides 50. In other words, there is only one fixing member 54 designed with a hook structure 542 in a combination structure between the extension column 52 and the rear wall 14 of the housing 10, while other combination structures do not have a hook structure (such as a positioning member 53).

In some embodiments, referring to FIG. 1, FIG. 2, FIG. 4, FIG. 5, and FIG. 6, the heat sink 20 may include a through hole 26 penetrating through the heat dissipation fins 22 and the thermal conductive platform 21. The extension column 52 of each of the light guide members 50 extends from the upper side of the heat sink 20 through the corresponding through hole 26 to the lower side of the heat sink 20, and further extends to an outer side of the rear wall 14 of the housing 10. Herein, each of the through holes 26 does not overlap the housing 10, and the vertical projection (that is, a vertical projection of the heat sink 20 to the housing 10) of each of the through holes 26 is adjacent to the rear wall 14 of the housing 10. The shortest distance between the vertical projection of each of the through holes 26 and the rear wall 14 of the housing 10 is less than a height of the corresponding bump, that is, the height H1 of the first bump 541 or the height H4 of the second bump 531.

Herein, referring to FIG. 1 and FIG. 2, each of the light guide members 50 may further include: a bent end 55. Each of the bent ends 55 is bent downward and extends from one end of the tube body 51 and fixed onto a cushion block 60. In other words, one end of each of the bent ends 55 is connected to one end of the corresponding tube body 51. In some embodiments, the cushion block 60 may be fixed onto a printed circuit board (PCB) 70, as shown in FIG. 2. The cushion block 60 is provided with an insertion hole 61 for the other end of each of the bent ends 55 to be partially inserted. The printed circuit board 70 is provided with a light-emitting element (not shown), and the light-emitting element is located in the insertion hole 61. The tube body 51 and the bent end 55 may be made of light-transmitting materials. When the other end of the bent end 55 is inserted into the insertion hole 61, light emitted by the light-emitting element may be radiated into the bent end 55, and then refracted inside the bent end 55 and the tube body 51 to be transmitted to the whole bent end 55 and the tube body 51. Herein, the light-emitting element can indicate whether a circuit on the printed circuit board 70 and an optical module (not shown) are conductive. In addition, when the optical module and the circuit on the printed circuit board 70 are conductive, the light-emitting element may be driven to emit light to enter the light guide member 50, and then the light guide member 50 will emit light, to observe whether the related assembly operates normally. Moreover, the light-emitting element can further indicate whether the connector assembly 1 and the docking connector are conductive. When the docking connector is inserted into the insertion cavity 11 of the connector assembly 1 and electrically connected to a connection interface (not shown) in the insertion cavity 11, the light-emitting element is driven to emit light to enter the light guide member 50, and then the light guide member 50 can emit light, to observe whether the related assembly operates normally.

Figure 9:
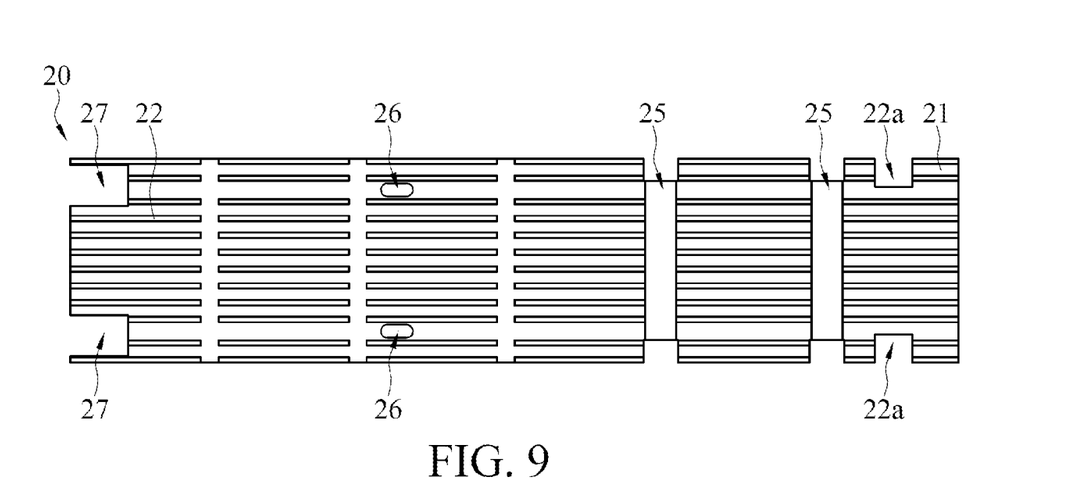
FIG. 9 is an enlarged top view of a heat sink according to another embodiment.

In some embodiments, referring to FIG. 1, FIG. 2, FIG. 4, and FIG. 5, the heat sink 20 may include a notch 27 penetrating through the heat dissipation fins 22 and the thermal conductive platform 21. The bent end 55 of each of the light guide members 50 extends from the upper side of the heat sink 20 through the corresponding notch 27 to the lower side of the heat sink 20, and further extends to the cushion block 60 and is inserted into the corresponding insertion hole 61 on the cushion block 60. In an example, the notch 27 may be located at a corner of the rear side of the heat sink 20. In an example, the notch 27 may be located at an edge (that is, a short side edge away from one side of the insertion opening of the insertion cavity 11) of a rear end of the heat sink 20, as shown in FIG. 9. Herein, a length of the tube body 51 of each of the light guide members 50 may be greater than or equal to a length of the heat sink 20.

Figure 10:
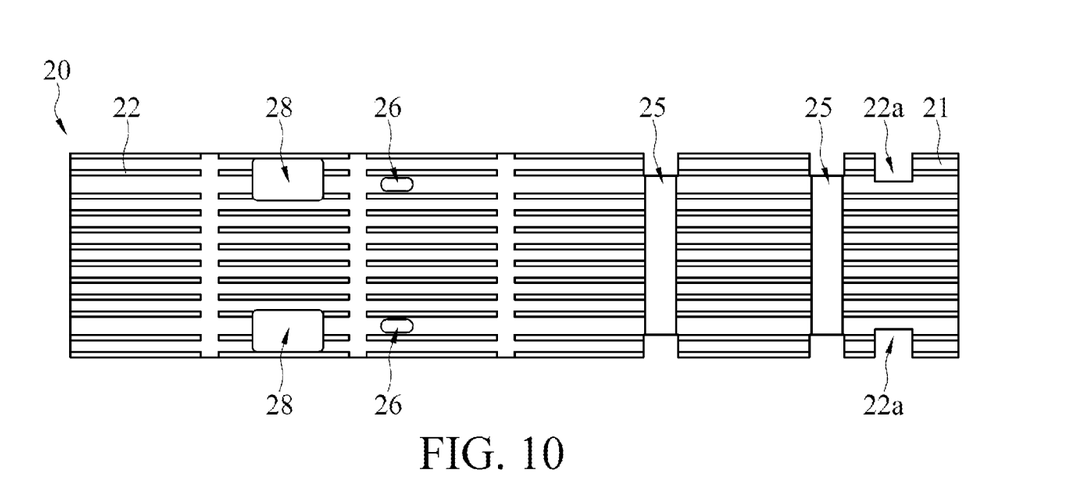
FIG. 10 is an enlarged top view of a heat sink according to still another embodiment.

In some embodiments, the notch 27 may be replaced by an opening 28 penetrating through the heat dissipation fin 22 and the thermal conductive platform 21, as shown in FIG. 10. The bent end 55 of each of the light guide members 50 extends from the upper side of the heat sink 20 through the corresponding opening 28 to the lower side of the heat sink 20, and further extends to the cushion block 60 and is inserted into the corresponding insertion hole 61 on the cushion block 60. Herein, the length of the tube body 51 of each of the light guide members 50 may be less than or equal to the length of the heat sink 20.

In some embodiments, referring to FIG. 1 and FIG. 2, each of the light guide members 50 may include: a positioning portion 56. The positioning portion 56 is connected to the tube body 51 and is adjacent to one end of the insertion opening of the insertion cavity 11. The bottom of the positioning portion 56 is fixed onto a side tube body of the tube body 51, and the top of the positioning portion 56 protrudes outward. The heat dissipation fin 22 of the heat sink 20 at a position corresponding to the positioning portion 56 has an opening 22a. The side wall 15 of the housing 10 extends upward to form a positioning member 15d matching the positioning portion 56. During assembly, the top of the positioning portion 56 passes through the opening 22a and is fixed onto the positioning member 15d. In an example, the positioning member 15d may be a clamping member configured to clamp the corresponding positioning portion 56.

In some embodiments, referring to FIG. 2, the connector assembly 1 may further include a heat dissipation block 80. A top wall 12 of the housing 10 has a contact window 16. The contact window 16 is in communication with the insertion cavity 11 and outside of the housing 10. A size of the heat dissipation block 80 substantially matches the contact window 16. During assembly, the heat dissipation block 80 is located between the thermal conductive member 30 and the insertion cavity 11 and embedded in the contact window 16. In some embodiments, the docking connector mated with the connector assembly 1 has an optical module, and when the docking connector is inserted into the insertion cavity 11 of the connector assembly 1, the optical module is located in the insertion cavity 11. The contact window 16 is disposed at a position corresponding to the optical module.

In some embodiments, referring to FIG. 2, the connector assembly 1 may also be fixed onto the printed circuit board 70. A plurality of insertion members 15e extend downward from the side wall 15 of the housing 10. The insertion members 15e may be inserted into corresponding insertion holes 71 on the printed circuit board 70, so as to fix the housing 10 onto the printed circuit board 70.

It should be understood that although the foregoing embodiment is described in detail by using the housing 10 having a single insertion cavity 11 as an example, the present disclosure is not limited thereto. According to actual requirements, the housing 10 may be separated into upper and lower chambers via a sandwiching layer, so that the housing 10 has a plurality of insertion cavities 11 arranged up and down for the insertion of a plurality of docking connectors, and/or the housing 10 may further be separated into left and right chambers via a partition, such that the housing 10 has a plurality of insertion cavities 11 arranged in parallel for the insertion of a plurality of docking connectors. In addition, when the housing 10 has the plurality of insertion cavities 11 arranged in parallel, each of the insertion cavities 11 corresponds to a set of heat dissipation structures (that is, the heat sink 20, the thermal conductive member 30, the heat dissipation block 80, and the elastic fastener 40) and a set of light guide members 50 (such as a pair of light guide members 50). The assembly method is the same as that in the previous embodiment, and therefore details are not described again.

Based on the above, the connector assembly of any embodiment can quickly dissipate a large amount of heat generated thereby into the air through the heat dissipation structure during use, to avoid the rapid rise in the overall temperature of the connector assembly. In addition, in the connector assembly of any embodiment, the light guide member thereof is easily installed. After assembly, the connector assembly of any embodiment still has certain stability without affecting the heat dissipation performance of the heat dissipation structure.

Although the present disclosure has been described in considerable detail with reference to certain preferred embodiments thereof, the disclosure is not for limiting the scope of the disclosure. Persons having ordinary skill in the art may make various modifications and changes without departing from the scope and spirit of the disclosure. Therefore, the scope of the appended claims should not be limited to the description of the preferred embodiments described above.

What is claimed is:

1. A connector assembly, comprising:
a housing having an insertion cavity; and
at least one light guide member, each comprising:
a tube body located on the housing;
an extension column extending downward from the tube body to a rear side of the housing;
a positioning member located on the extension column and inserted into a rear wall of the housing; and
a fixing member located on the extension column and inserted into the rear wall of the housing, wherein the fixing member comprises a first bump protruding from the extension column toward the rear wall of the housing and a hook structure located on the first bump, and when each of the at least one light guide member is assembled onto the housing, the first bump is inserted into the rear wall of the housing, and the hook structure is hooked into the rear wall of the housing.

2. The connector assembly according to claim 1, wherein the extension column of each of the at least one light guide member has a single one of the fixing member.

3. The connector assembly according to claim 1, wherein the positioning member of each of the at least one light guide member does not have the hook structure.

4. The connector assembly according to claim 1, wherein the positioning member comprises a second bump protruding from the extension column toward the rear wall of the housing and a guiding slope located at an edge of a top surface of the second bump.

5. The connector assembly according to claim 4, wherein the guiding slope surrounds the edge of the top surface of the second bump.

6. The connector assembly according to claim 4, wherein the guiding slope is formed by inclining a small section at the edge of the top surface of the second bump toward a bottom surface of the second bump.

7. The connector assembly according to claim 4, wherein the second bump is a semicircular cylinder.

8. The connector assembly according to claim 1, wherein the positioning member comprises a second bump protruding from the extension column toward the rear wall of the housing, and a top end of the second bump is tapered from a side away from the top surface of the second bump toward the top surface of the second bump.

9. The connector assembly according to claim 1, wherein the first bump is a semicircular cylinder.

10. The connector assembly according to claim 1, wherein the hook structure is located on a side wall of the first bump, and an upper edge of the hook structure abuts against a top surface of the first bump.

11. The connector assembly according to claim 1, wherein the fixing member further comprises a guiding slope, and the guiding slope is located at an edge of a top surface of the first bump.

12. The connector assembly according to claim 11, wherein the guiding slope is located on the other side of the edge of the top surface of the first bump relative to the hook structure.

13. The connector assembly according to claim 11, wherein the guiding slope is formed by inclining the edge of the top surface of the first bump toward a bottom surface of the first bump relative to a small section on one side of the hook structure.

14. The connector assembly according to claim 11, wherein a distance between an upper edge of the guiding slope and a lower edge of the guiding slope is less than a length of the hook structure.

15. The connector assembly according to claim 1, wherein the rear wall of the housing has a plurality of holes respectively corresponding to the positioning member and the fixing member, the rear wall of the housing protrudes into each of the holes to form a convex point, when each of the at least one light guide member is assembled onto the housing, the positioning member and the fixing member are respectively inserted into the corresponding holes, the convex point in the hole corresponding to the fixing member is pressed against a side wall of the first bump, and the convex point in the hole corresponding to the positioning member is pressed against a side wall of the positioning member.

16. The connector assembly according to claim 15, wherein when the fixing member is inserted into the corresponding hole, a side wall of the fixing member is attached to the other side of the corresponding hole relative to the convex point.

17. The connector assembly according to claim 16, wherein the side wall of the first bump comprises a curved surface and a plane coupled to two opposite side edges of the curved surface, and when the fixing member is inserted into the corresponding hole, the curved surface of the first bump is attached to an edge of the corresponding hole.

18. The connector assembly according to claim 15, wherein when the positioning member is inserted into the corresponding holes, the side wall of the positioning member is attached to the other side of the corresponding hole relative to the convex point.

19. The connector assembly according to claim 18, wherein the positioning member comprises a second bump protruding from the extension column toward the rear wall of the housing, a side wall of the second bump comprises a curved surface and a plane coupled to two opposite side edges of the curved surface, and when all of the positioning members are inserted into the corresponding holes, the curved surface of the second bump is attached to an edge of the corresponding hole.

20. The connector assembly according to claim 15, wherein each of the holes is cashew-shaped.

21. The connector assembly according to claim 1, wherein each of the at least one light guide member further comprises: a positioning portion connected to the tube body and adjacent to one end of an insertion opening of the insertion cavity, wherein another positioning member matching the positioning portion of each of the at least one light guide member extends upward from a side wall of the housing, and when each of the light guide members is assembled onto the housing, each of the positioning portions is fixed to the corresponding positioning member.

22. The connector assembly according to claim 21, wherein the another positioning member is a clamping member, and the clamping member is configured to clamp the corresponding positioning portion.

23. The connector assembly according to claim 1, wherein each of the at least one light guide member further comprises: a bent end bent downward and extending from one end of the tube body and fixed onto a cushion block.

24. The connector assembly according to claim 1, further comprising:
a heat sink located on the housing; and
a thermal conductive member sandwiched between the heat sink and the housing.

25. The connector assembly according to claim 24, further comprising:
an elastic fastener configured to fasten the heat sink to the housing.

26. The connector assembly according to claim 24, wherein the heat sink has at least one through hole, and the extension column of each of the at least one light guide member passes through the heat sink via the corresponding through hole.

27. The connector assembly according to claim 24, wherein the heat sink has at least one opening, each of the at least one light guide member further comprises: a bent end bent downward and extending from one end of the tube body, and the bent end of each of the at least one light guide member passes through the heat sink via the corresponding opening.

28. The connector assembly according to claim 24, wherein the heat sink has at least one notch, each of the at least one light guide member further comprises: a bent end bent downward and extending from one end of the tube body, and the bent end of each of the at least one light guide member passes through the heat sink via the corresponding notch.

29. The connector assembly according to claim 28, wherein each of the at least one notch is located at a rear end of the heat sink.

30. The connector assembly according to claim 24, wherein a top wall of the housing has a contact window in communication with the insertion cavity and outside of the housing, and the connector assembly further comprises a heat dissipation block, and the heat dissipation block is located between the thermal conductive member and the insertion cavity and embedded in the contact window.

* * * * *